UNITED STATES PATENT OFFICE.

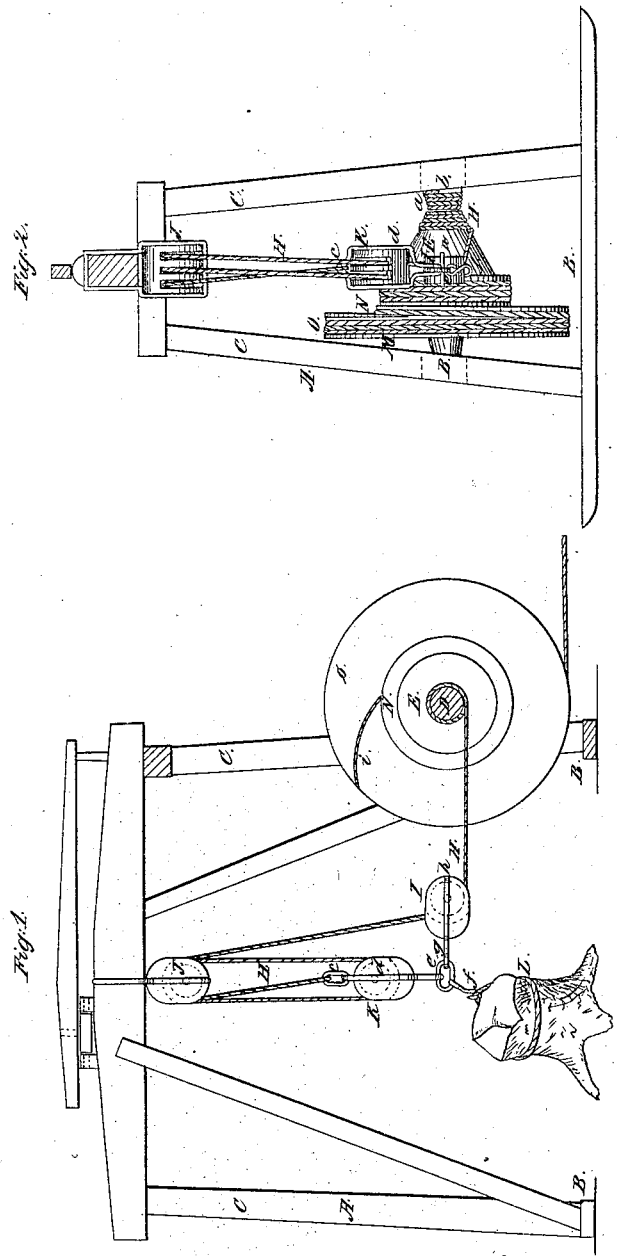

F. M. MORGAN, OF HUNTINGTON, INDIANA.

IMPROVEMENT IN STUMP-PULLERS.

Specification forming part of Letters Patent No. 42,864, dated May 24, 1864.

*To all whom it may concern:*

Be it known that I, F. M. MORGAN, of Huntington, in the county of Huntington and State of Indiana, have invented a new and Improved Stump-Puller; and I do hereby declare that the following is a full, clear, and exact description of the same, reference being had to the accompanying drawings, making a part of this specification, in which—

Figure 1 represents a longitudinal vertical section of my invention, showing its operation. Fig. 2 is an end view of the same.

Similar letters of reference indicate corresponding parts in both figures.

This invention relates to certain improvements in that class of stump-pullers in which the power of the draft-animals is multiplied by means of pulley-blocks, drums, and sheaves of various diameters.

The nature of this invention and its peculiar advantages will be readily understood from the following description.

A represents a frame, made of wood or any other suitable material, of sufficient strength for the occasion and supported by two sled-runners, B, so that the machine can be readily moved from place to place. The uprights C of this frame form the bearings for the shaft D, which carries the drum E and the pulleys N O. The drum E is made in the form of a double cone, as clearly shown in Fig. 2, its smallest portion, a, being at a short distance from the end b, and its diameter increases rapidly from the portion a toward the pulley G.

H is a rope, which is firmly secured with one end to the end b of the drum E, and it extends through the snatch-block I and through and around the triple block J and double block K to a ring, c, as clearly shown in Fig. 1. This ring is firmly secured to the strap d, which passes round the block K, and said strap is provided at its lower end with a loop to receive a ring, e, which connects by means of a hook, f, with the root-chain L and by a loop, g, and strap h with the snatch-block I, as clearly shown in the drawings. The draft rope or chain M is fastened with one end to the circumference of the small pulley N, winding several times around the same; thence it ascends over the curved flange i to the large pulley O, and after being wound several times round this pulley it extends to the double-tree or other device to which the draft-animals are hitched.

In order to pull a stump, the machine is drawn to the same and arranged over it so that the root-chain, after it has been firmly secured to the stump, can be conveniently hooked to the blocks I K, as shown in Fig. 1 of the drawings. The draft-animals are started and at first the rope H unwinds from the end b until by the time the root-chain has been drawn tight, said rope has reached the smallest part a of the drum E and the power of the machine is at its maximum. After the stump has been started, the rope H ascends the drum E, and the power gradually decreases with a proportionate increase in speed, until finally the draft-rope M descends from the large pulley O to the small pulley N over the curved flange i, and thereby the speed with which the stump is raised from the ground is considerably increased. By the combination of the snatch-block I with the blocks J and K' the power exerted on the stump is in a lateral direction, and it is applied with much better effect than when it acts on the stump in a vertical direction, and by the arrangement of the two speeds O N of the draft-pulley and the double-cone drum E, the power and speed of the machine are rendered self-adjusting, according to the work to be effected, at any moment. At the beginning of the operation until the root-chain is drawn tight, the speed of the machine is increased, and in order to start the stump the machine is made to run slow and to exert its greatest power, and finally, when the stump is to be raised from the ground, the speed of the machine is increased while its power decreases.

It is obvious that the number of sheaves in the several blocks can be changed at pleasure, and I do not wish to confine myself to the precise number shown in the drawings.

What I claim as my invention, and desire to secure by Letters Patent, is—

1. The blocks I J K, arranged in combination with the root-chain L, rope H, double-cone drum E, and pulleys O N, substantially as and for the purpose herein shown and described.

2. The curved flange i, in combination with the pulleys O N, draft-rope M, drum E, and blocks I J K, constructed and operating in the manner and for the purpose substantially as herein specified.

F. M. MORGAN.

Witnesses:
J. S. GOSHORN,
JAMES M. BRATTON.